United States Patent Office 3,373,171
Patented Mar. 12, 1968

3,373,171
1-NAPHTHALENE-PROPIONIC ACID, 4-CARBOX-YL-α, 4-BIS(CARBOXYMETHYL)-1,2,3,4-TETRA-HYDRO-4,4,α, 1-DIANHYDRIDE
Howard Robert Lucas, Greenwich, and Roland Ralph Di Leone, Rowayton, Conn., assignors to American Cyanamid Company, Stamford, Conn., a corporation of Maine
No Drawing. Filed Mar. 23, 1965, Ser. No. 442,207
1 Claim. (Cl. 260—346.8)

ABSTRACT OF THE DISCLOSURE 1-naphthalene-propionic acid, 4 carboxyl-α, 4-bis(carboxymethyl)-1,2,3,4-tetrahydro-4,4,α, 1-dianhydride.

The present invention relates to certain new and useful chemical compositions of matter and a means for their synthesis.

Particularly speaking, our invention in its product aspect concerns a novel dianhydride reaction product of styrene and itaconic anhydride (A) which may be represented by the graphic structure:

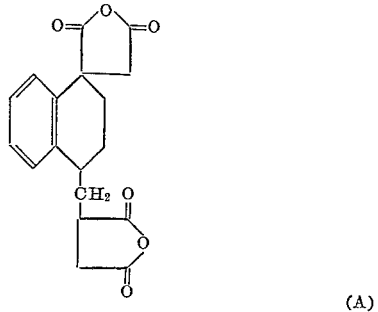

(A)

The above novel dianhydride is useful in that it has been found to be a highly effective curing agent for epoxy resins as well as being a useful starting material for the preparation of imine (I) and polyamide derivatives (II) of the following structures:

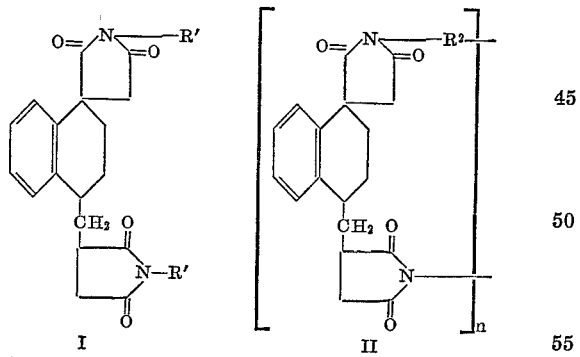

which are useful resins or resin forming materials and wherein R' and R² represents either alkyl groups such as ethyl, hexyl and the like or aryl groups such as phenyl or in the case of (I) the R' group may also be a hydroxyalkyl group such as hydroxy-methyl or an alkenyl group such as allyl. The reaction of our novel dianhydride to form derivatives of type (I) involves reaction with monoamines such as alkyl, alkenyl or aryl amines and the like while the preparation of the derivatives typified by structure (II) above involves reaction of the novel dianhydride with diamines such as dialkylamines or diarylamines in the presence of a solvent such as dimethyl formamide. The derivatives of the type illustrated by structure (II) may be either monomeric or by reaction with themselves form hard polymeric materials where n would be more than 1 and could be up to 400 depending upon the degree of condensation.

Therefore, our invention comprises the preparation of the novel reaction product (A) which is obtained by the reaction of styrene and 2 moles of itaconic anhydride as illustrated by the following reaction scheme:

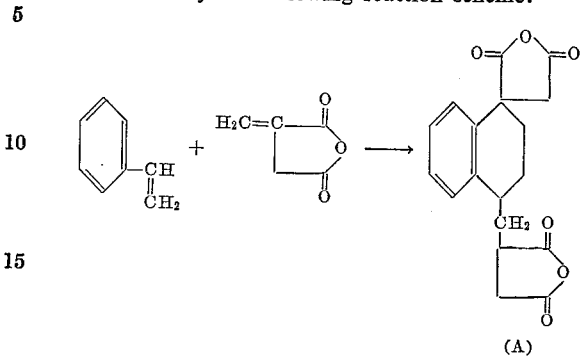

(A)

The above reaction proceeds at slightly elevated temperatures of the order of 95° C. and while the reaction is in progress a continuous stream of nitrogen is passed through the solution. Reaction is complete in 360 minutes and the final reaction product will precipitate on the removal of excess styrene and may be recrystallized from acetonitrile. Its structural configuration is confirmed by spectral analysis to conform to that postulated for the material. Upon evaluation the material is found to be an excellent curing agent for epoxide resins.

Our invention will be further concretely illustrated by a specific example of the preferred mode of practice of our invention to obtain the novel dianhydride (A). The various derivatives noted above are not included in these examples or in the appended claims for the reason that they will be treated in subsequent applications as end products obtained by use of our novel dianhydride reaction product as a working intermediate in their synthesis. For a legal definition of the scope of the present invention, attention may only be directed to the several appended claims:

Example 1

Charged 18 parts of itaconic anhydride and liquified by heating to 70° C. Then purged the system with $N_2$ followed by NO. The styrene (33.5 parts) was added and the mixture heated to 95° C. During the reaction a continuous stream of nitric oxide was passed through the solution. The product precipitated on the removal of excess styrene. The product was recrystallized from acetonitrile. M.P. 266–268° C.

*Analysis.*—Theory: C, 65.8. Found: C, 64.83. Theory: H, 4.92. Found: H, 4.78. Infrared showed desired product.

We claim:
1. A composition of matter having the structure:

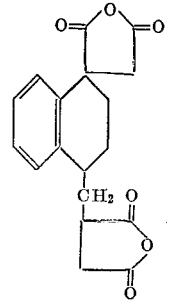

References Cited

UNITED STATES PATENTS 3,299,102  1/1967  Bradshaw _____ 260—346.3

NICHOLAS S. RIZZO, *Primary Examiner.*